(12) United States Patent
Parlamas et al.

(10) Patent No.: US 9,036,590 B2
(45) Date of Patent: *May 19, 2015

(54) METHOD AND APPARATUS FOR SHARING A SINGLE DATA CHANNEL FOR MULTIPLE SIGNALING FLOWS DESTINED TO MULTIPLE CORE NETWORKS

(71) Applicant: AT&T Intellectual Property I, L.P., Atlanta, GA (US)

(72) Inventors: Stephanie P. Parlamas, Colts Neck, NJ (US); Dennis Duffy, Decatur, GA (US); Leticia Johnson, Helotes, TX (US); Steven A. Siegel, Mendham, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 131 days.

This patent is subject to a terminal disclaimer.

(21) Appl. No.: 13/940,539

(22) Filed: Jul. 12, 2013

(65) Prior Publication Data
US 2013/0301577 A1 Nov. 14, 2013

Related U.S. Application Data

(63) Continuation of application No. 12/611,838, filed on Nov. 3, 2009, now Pat. No. 8,488,596.

(60) Provisional application No. 61/110,806, filed on Nov. 3, 2008.

(51) Int. Cl.
*H04L 29/02* (2006.01)
*H04W 72/04* (2009.01)
(Continued)

(52) U.S. Cl.
CPC ........ *H04W 72/0453* (2013.01); *H04W 76/022* (2013.01); *H04W 80/10* (2013.01); *H04L 65/1006* (2013.01); *H04L 65/1016* (2013.01); *H04L 65/1069* (2013.01)

(58) Field of Classification Search
CPC ............ H04L 65/1016; H04L 65/1033; H04L 65/1069; H04W 76/022
See application file for complete search history.

(56) References Cited

U.S. PATENT DOCUMENTS

| 6,735,187 B1 | 5/2004 | Helander et al. |
| 8,488,596 B2 | 7/2013 | Parlamas |

(Continued)

FOREIGN PATENT DOCUMENTS

WO WO 2006/001683 1/2006

OTHER PUBLICATIONS

3GPP TS 29.328 v8.2.0 (Sep. 2008), 3$^{rd}$ Generation Partnership Project; Technical Specification Group Core Network and Terminals; IP Multimedia (IM) Subsystem Sh Interface; Signaling flows and message contents (Release 8), Sep. 2008, 45 pages.

(Continued)

*Primary Examiner* — Hoon J Chung

(57) ABSTRACT

A method and apparatus for sharing a single data channel for multiple signaling flows destined to multiple core networks are disclosed. For example, the method receives a plurality of service requests from a plurality of corresponding service clients on a single mobile endpoint device, where each of the plurality of corresponding service clients is to be registered with a different corresponding Internet Protocol Multimedia Subsystem (IMS) network. The method establishes the single data channel to support a plurality of signaling flows associated with the plurality of service requests simultaneously, and routes each signaling message associated with the plurality of service requests to the corresponding IMS network.

20 Claims, 3 Drawing Sheets

(51) Int. Cl.
*H04W 76/02* (2009.01)
*H04L 29/06* (2006.01)
*H04W 80/10* (2009.01)

(56) References Cited

U.S. PATENT DOCUMENTS

2003/0039232 A1 2/2003 Casati et al.
2004/0228362 A1 11/2004 Maki et al.
2007/0025301 A1 2/2007 Petersson et al.
2007/0121608 A1 5/2007 Gu et al.
2008/0276003 A1 11/2008 Dudley et al.
2010/0046362 A1 2/2010 Zhu et al.

OTHER PUBLICATIONS

3GPP TS 29.329 v8.1.0 (Jun. 2008), 3rd Generation Partnership Project; Technical Specification Group Core Network and Terminals; Sh Interface based on the Diameter Protocol; Protocol details (Release 8), Jun. 2008, 18 pages.

METHOD AND APPARATUS FOR SHARING A SINGLE DATA CHANNEL FOR MULTIPLE SIGNALING FLOWS DESTINED TO MULTIPLE CORE NETWORKS

This application is a continuation of U.S. patent application Ser. No. 12/611,838, filed Nov. 3, 2009, which is currently allowed and claims the benefit of U.S. Provisional Application No. 61/110,806 filed on Nov. 3, 2008, all of which are herein incorporated by reference in their entirety.

The present invention relates generally to communication network and, more particularly, to a method and apparatus for sharing a single data channel for multiple signaling flows destined to multiple core networks.

BACKGROUND OF THE INVENTION

As a service provider uses Internet Protocol (IP) Multimedia Subsystem (IMS) based technology to develop a converged voice and data services portfolio, multiple IMS core networks are being built to support this goal. IMS standards support interworking between IMS core networks and provide specifications for accessing a service application via any of the IMS core networks. However, the IMS standards do not address the need for a service provider to be able to use common resources to support multiple applications running in parallel that are provided by different IMS core networks.

For example, whenever a mobile endpoint device needs to setup a service request (e.g., a voice call), a data channel, such as a General Packet Radio Services (GPRS) Tunneling Protocol (GTP) tunnel, is setup in the mobile access network to signal non-call associated information, requests, or queries. Each data channel supports only one signaling flow, e.g., only one Packet Data Protocol (PDP) context is supported per GTP tunnel. Therefore, when a different type of service (e.g., a video session) is requested by the same mobile endpoint device, another data channel has to be setup to signal the new service session. The setup of each data channel can take 10 or more seconds and the approach does not allow the sharing of network resources in the mobile access network.

SUMMARY OF THE INVENTION

In one embodiment, the present invention discloses a method and apparatus for sharing a single data channel for multiple signaling flows destined to multiple core networks. For example, the method receives a plurality of service requests from a plurality of corresponding service clients on a single mobile endpoint device, where each of the plurality of corresponding service clients is to be registered with a different corresponding Internet Protocol Multimedia Subsystem (IMS) network. The method establishes the single data channel to support a plurality of signaling flows associated with the plurality of service requests simultaneously, and routes each signaling message associated with the plurality of service requests to the corresponding IMS network.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

As discussed above, a data channel, such as a GTP tunnel, can only support one signaling flow, e.g., one PDP context, between a service client on a mobile endpoint device and a corresponding IMS core network and does not allow efficient sharing of valuable mobile access network resources. Thus, one or more GTP tunnels need to be independently established to support signaling communications between different service clients running on a mobile endpoint device and their corresponding applications in the application layer of the corresponding IMS core networks. Data and video applications use the data channel in a bursty and sporadic manner and the time necessary to establish a data channel can be slow (e.g., 10 or more seconds).

To address this criticality, the present invention enables the sharing of a single data channel for multiple signaling flows destined to different core networks. In one embodiment, the present invention enables a method and apparatus for using a common packet data channel, such as a single GTP tunnel, for non-call associated signaling flows between multiple service clients in a mobile endpoint device (e.g., a mobile phone, a smart phone, and the like) and multiple corresponding IMS core networks for IP-based applications to provide the most efficient use of a persistent data channel. Non-call associated signaling (NCAS) is signaling that is independent of an end-to-end bearer connection, including support for the functions of registration, authentication, and validation.

Broadly defined, IMS is an architectural framework for delivering Internet Protocol (IP) multimedia services to mobile users defined by the standard body, 3rd Generation Partnership Project (3GPP).

It should be noted that multiple IMS core networks can provide similar or different services supported by one or more service providers. Hence, in one embodiment the present invention enables a mobile endpoint device to access services using a single data channel from one or more service providers simultaneously.

Figure 1:
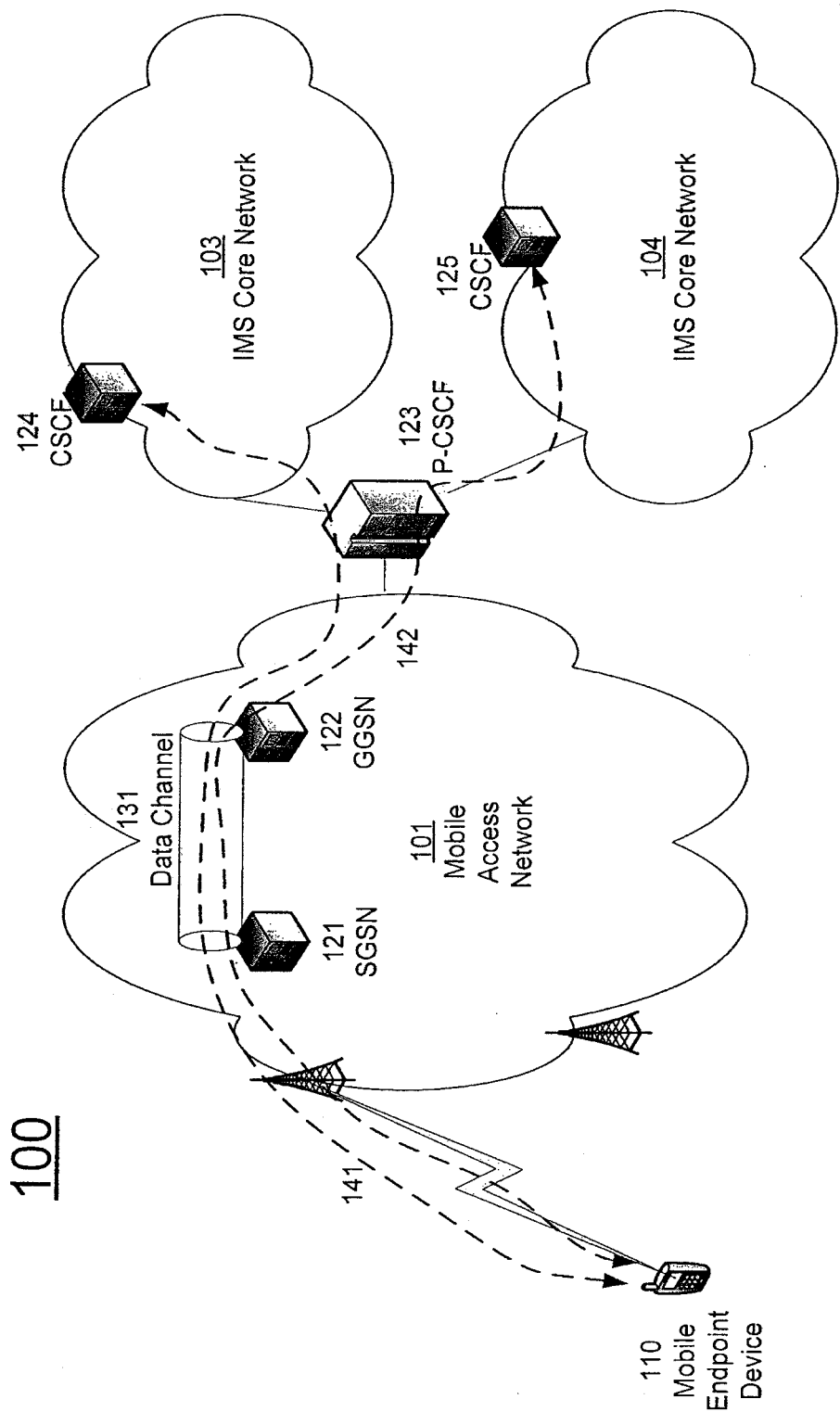
FIG. 1 illustrates an exemplary communication network sharing a single data channel to support services provided by multiple IMS core networks related to the present invention.

FIG. 1 illustrates an exemplary communication network 100 sharing a single data channel to support services provided by multiple IMS core networks related to the present invention. In FIG. 1, mobile endpoint device 110 uses mobile access network 101 to access services provided by IMS core networks 103 and 104. It should be noted that although only one mobile endpoint device and two IMS core networks are shown in FIG. 1, the present invention is applicable to any number of mobile endpoint devices and IMS core networks. In one embodiment, the mobile endpoint device 110 contains multiple service clients, e.g., a video viewing service client and a Voice over Internet Protocol (VoIP) service client and the like. These service clients deployed in the mobile endpoint device 110 are used to access various services provided by the IMS core networks 103 and 104. Note that IMS core networks 103 and 104 can be operated by the same service provider or two different service providers. Mobile access network 101 is interconnected to the IMS core networks 103 and 104 via a Proxy Call Session Control Function (P-CSCF) network element 123.

Broadly defined, a Call Session Control Function (CSCF) network element is an IP Multimedia Services (IMS) based session control layer network element that is responsible for call session setup, mid-session control, and teardown. In particular, an Interrogating CSCF (I-CSCF) is a network element that provides topology hiding and helps to forward requests between a CSG and a Serving CSCF (S-CSCF) network element as well as Application Servers (AS). A Serving CSCF (S-CSCF) is a network element that provides session control, call signaling routing to applications, and SIP registrar functions. A P-CSCF is a network element that acts as the point of entry to an IMS core network with well-known addresses within the network and routes incoming requests based on registration status.

In FIG. 1, mobile endpoint device 110 first requests a voice call service with the IMS core network 104 using a first service client, e.g., a Voice over IP (VoIP) service client. Data channel 131 (e.g., a GTP tunnel) is thus setup between a Serving GPRS Support Node (SGSN) 121 and a Gateway GPRS Support Node (GGSN) 122 to support non-call associated signaling flow 142, e.g., a PDP context in the data channel 131, between mobile endpoint device 110 and the CSCF network element 125 in the IMS core network 104.

Broadly defined, a PDP context is a data structure that is present on both a SGSN and a corresponding GGSN which contains session information of a subscriber with an active session. A GGSN acts as an interface between a GPRS backbone network and external packet data networks such as a radio packet network and an Internet Protocol network. A SGSN is responsible for the delivery of data packets to and from mobile endpoint devices within its geographical service area.

Note that the CSCF 125 can perform one or more of the following functions:
  Interrogating CSCF (I-CSCF) function that provides topology hiding and helps forward requests between P-CSCF and Serving-CSCF as well as Application Servers; and
  Serving CSCF (S-CSCF) function provides session control, call signaling routing to applications, and SIP registrar functions.

Subsequently, the mobile endpoint device 110 requests a video viewing service with the IMS core network 103 using a second service client, e.g., a video viewing service client. The data channel 131 that is already setup between SGSN 121 and GGSN 122 is then reused to support non-call associated signaling flow 141, e.g., another PDP context, between the mobile endpoint device 110 and the CSCF network element 124 in the IMS core network 103. Note that the CSCF 124 can perform one or more of the following functions:
  Interrogating CSCF (I-CSCF) function that provides topology hiding and helps forward requests between P-CSCF and Serving-CSCF as well as Application Servers; and
  Serving CSCF (S-CSCF) function provides session control, call signaling routing to applications, and SIP registrar functions.

Note that the two service clients residing in the mobile endpoint device 110 are configured to use the same data channel 131 in the mobile access network 101 for their signaling related communications with their corresponding IMS core networks. Data channel 131 is persistent and remains established as long as at least one of the service clients on the mobile endpoint device 110 is active.

In one embodiment, the VoIP client in the mobile endpoint device 110 is registered with its serving IMS core network 104. For example, a user of the mobile endpoint device 110 with a Mobile Station Integrated Services Digital Network (MSISDN) number (such as 3214567890) is registered with the IMS core network 104 for voice services with a public user identification PUID=3214567890@providervoip.ims.net, where provider.voip.ims.net is the domain of the VoIP service provided by the IMS core network 104. It should be noted that this example is only illustrative and should not be interpreted as a limitation of the present invention.

Similarly, in one embodiment, the video viewing client in the mobile endpoint device 110 is registered with its serving IMS core network 103. For example, the user of the mobile endpoint device 110 using the same MSISDN number (e.g. 3214567890) can be registered with the IMS core network 103 for video viewing services with a public user identification PUID=3214567890@providervideo.ims.net, where provider.video.ims.net is the domain of the video service provided by IMS core network 104. Again, it should be noted that this example is only illustrative and should not be interpreted as a limitation of the present invention.

When a service client in the mobile endpoint device 110 needs to use data channel 131 to signal with an IMS core network, the service client includes the appropriate PUID in the SIP messages it sends. P-CSCF 123 routes a SIP message from the data channel 131 according to the PUID information in the SIP message. For instance, a SIP message comprising PUID=3214567890@provider.video.ims.net will be routed to the IMS core network 103 for processing and a SIP message comprising PUID=3214567890@provider.voip.ims.net will be routed to the IMS core network 104 for processing.

Thus, the present invention allows more efficient use of resources in the mobile access network 101 by sharing a single data channel to support multiple service clients on the mobile endpoint device 110. More specifically, it eliminates the need to set up a second independent data channel and reduces processing overhead on the mobile endpoint device 110 to achieve longer battery life.

Figure 2:
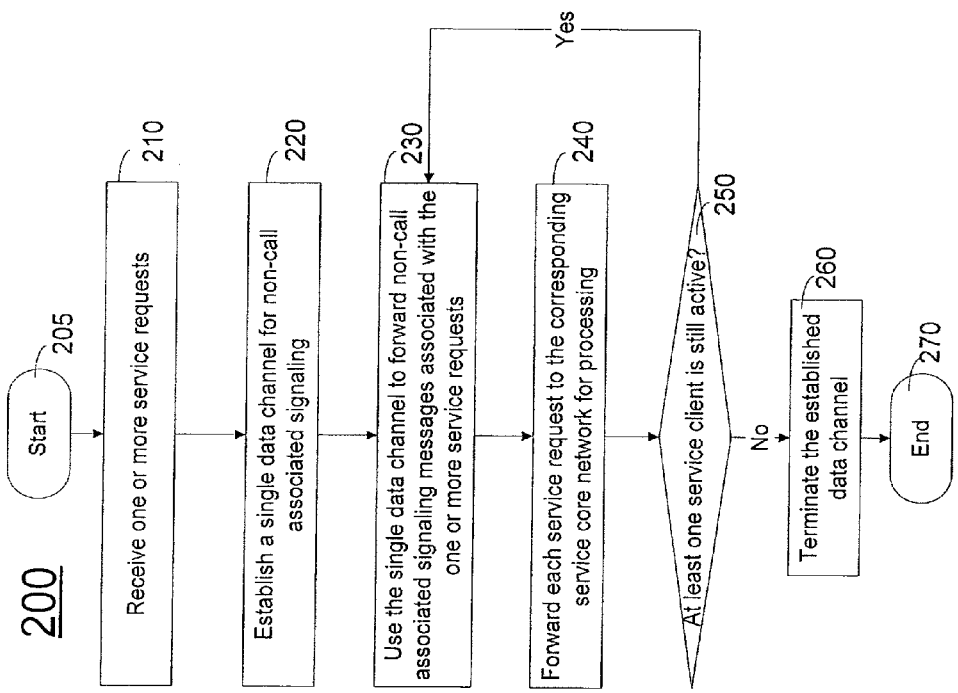
FIG. 2 illustrates a flowchart of a method of sharing a single data channel to support services provided by multiple IMS core networks of the present invention.

FIG. 2 illustrates a flowchart of a method 200 of sharing a single data channel to support services provided by multiple IMS core networks of the present invention. For example, one or more steps of method 200 are performed by components of the mobile access network (e.g., a SGSN, a GGSN, and/or a P-CSCF). Method 200 starts in step 205 and proceeds to step 210.

In step 210, the method receives one or more service requests from one or more service clients on a mobile endpoint device. The one or more service requests are received by the mobile access network serving the mobile endpoint device. The received non-call associated signaling messages for each service request comprise the corresponding registered PUID associated with each service client on the mobile endpoint device.

In step 220, the method establishes a single data channel, such as a single GTP tunnel, to support the one or more service requests. If there is no data channel established when a service request is received, then the method sets up a new data channel to support the service request from the mobile endpoint device. If there is already a data channel established when a service request is received, the method reuses the already established data channel to support the service request from the same user of the mobile endpoint device. The data channel is established between a SGSN and a GGSN serving the mobile endpoint device and will remain established as long as at least one service client on the mobile endpoint device is active.

In step 230, the method uses the established single data channel to send non-call associated signaling messages associated with the one or more service requests to their corresponding IMS core networks.

In step 240, the method uses the PUID contained in each signaling message to determine the corresponding IMS core network to which the non-call associated signaling message is to be routed for processing. The corresponding IMS core network to be routed to is determined by a P-CSCF using the PUID information. Once determined, each signaling message is forwarded by the P-CSCF.

In step 250, the method checks if at least one of the service clients of the mobile endpoint device is still active. If at least one of the service clients of the mobile endpoint device is still active, then the method proceeds back to step 230; otherwise, the method proceeds to step 260. The check is performed by the mobile access network serving the mobile endpoint device.

In step 260, the method terminates the established data channel. The method ends in step 270.

It should be noted that although not specifically specified, one or more steps of method 200 may include a storing, displaying and/or outputting step as required for a particular application. In other words, any data, records, fields, and/or intermediate results discussed in the method 200 can be stored, displayed and/or outputted to another device as required for a particular application. Furthermore, steps or blocks in FIG. 2 that recite a determining operation, or involve a decision, do not necessarily require that both branches of the determining operation be practiced. In other words, one of the branches of the determining operation can be deemed as an optional step.

Figure 3:
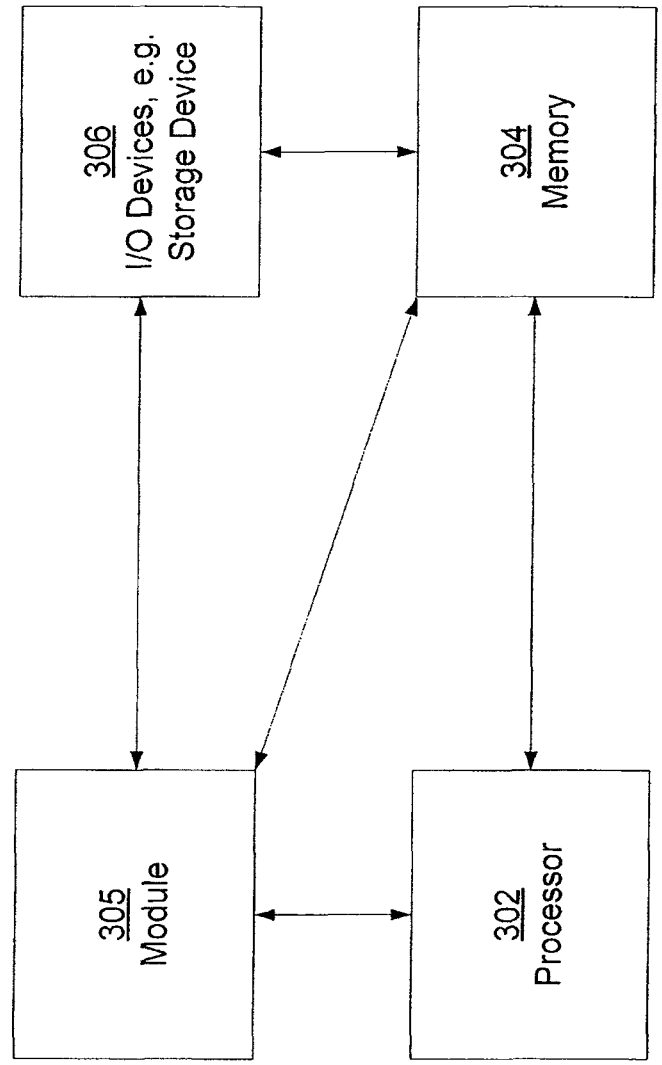
FIG. 3 illustrates a high level block diagram of a general purpose computer suitable for use in performing the functions described herein.

FIG. 3 depicts a high level block diagram of a general purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for sharing a single data channel for multiple signaling flows destined to multiple core networks, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 305 for sharing a single data channel for multiple signaling flows destined to multiple core networks can be loaded into memory 304 and executed by processor 302 to implement the functions as discussed above. As such, the present process 305 for sharing a single data channel for multiple signaling flows destined to multiple core networks (including associated data structures) of the present invention can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for establishing a single data channel, comprising:
   receiving, by a processor, a plurality of service requests from a plurality of corresponding service clients of a single mobile endpoint device, where each of the plurality of corresponding service clients is to be registered with a different corresponding Internet protocol multimedia subsystem network;
   establishing, by the processor, the single data channel to support a plurality of signaling flows associated with the plurality of service requests simultaneously, wherein the single data channel comprises a general packet radio services tunneling protocol tunnel, and wherein the plurality of signaling flows comprises a plurality of packet data protocol contexts; and
   routing, by the processor, each signaling message associated with the plurality of service requests to the different corresponding internet protocol multimedia subsystem network via the single data channel.

2. The method of claim 1, wherein the plurality of signaling flows comprises non-call associated signaling flows.

3. The method of claim 1, wherein a user of the single mobile endpoint device is registered in accordance with a public user identifier with the corresponding internet protocol multimedia subsystem network.

4. The method of claim 3, wherein the public user identifier comprises a mobile station integrated services digital network number and a domain of the corresponding Internet protocol multimedia subsystem network serving each of the plurality of corresponding service clients.

5. The method of claim 1, wherein the single data channel is established between a serving general packet radio services support node and a gateway general packet radio services support node in a mobile access network serving the single mobile endpoint device.

6. The method of claim 1, wherein the routing comprises:
   parsing a public user identifier embedded in each signaling message; and
   routing each signaling message to the corresponding internet protocol multimedia subsystem network using the public user identifier.

7. The method of claim 1, wherein the processor is a processor of a proxy call session control function network element.

8. The method of claim 7, wherein the proxy call session control function network element supports a connectivity to a plurality of internet protocol multimedia subsystem networks.

9. The method of claim 8, wherein each of the plurality of internet protocol multimedia subsystem networks is operated by a different service provider.

10. The method of claim 1, wherein the single data channel remains established if at least one of the plurality of corresponding service clients is active.

11. A non-transitory computer-readable medium storing instructions, which, when executed by a processor, cause the processor to perform operations for establishing a single data channel, the operations comprising:
   receiving a plurality of service requests from a plurality of corresponding service clients of a single mobile endpoint device, where each of the plurality of corresponding service clients is to be registered with a different corresponding internet protocol multimedia subsystem network;
   establishing the single data channel to support a plurality of signaling flows associated with the plurality of service requests simultaneously, wherein the single data channel comprises a general packet radio services tunneling protocol tunnel, and wherein the plurality of signaling flows comprises a plurality of packet data protocol contexts; and routing each signaling message associated with the plurality of service requests to the different corresponding internet protocol multimedia subsystem network via the single data channel.

12. The non-transitory computer-readable medium of claim 11, wherein the plurality of signaling flows comprises non-call associated signaling flows.

13. The non-transitory computer-readable medium of claim 11, wherein a user of the single mobile endpoint device is registered in accordance with a public user identifier with the corresponding internet protocol multimedia subsystem network.

14. The non-transitory computer-readable medium of claim 13, wherein the public user identifier comprises a mobile station integrated services digital network number and a domain of the corresponding internet protocol multimedia subsystem network serving each of the plurality of corresponding service clients.

15. The non-transitory computer-readable medium of claim 11, wherein the routing comprises:
  parsing a public user identifier embedded in each signaling message; and
  routing each signaling message to the corresponding internet protocol multimedia subsystem network using the public user identifier.

16. A system for establishing a single data channel, comprising:
  a processor; and
  a non-transitory computer-readable medium storing instructions which, when executed by the processor, cause the processor to perform operations, the operations comprising:
    receiving a plurality of service requests from a plurality of corresponding service clients of a single mobile endpoint device, where each of the plurality of corresponding service clients is to be registered with a different corresponding internet protocol multimedia subsystem network;
    establishing the single data channel to support a plurality of signaling flows associated with the plurality of service requests simultaneously, wherein the single data channel comprises a general packet radio services tunneling protocol tunnel, and wherein the plurality of signaling flows comprises a plurality of packet data protocol contexts; and
    routing each signaling message associated with the plurality of service requests to the different corresponding internet protocol multimedia subsystem network via the single data channel.

17. The system of claim 16, wherein the plurality of signaling flows comprises non-call associated signaling flows.

18. The system of claim 16, wherein a user of the single mobile endpoint device is registered in accordance with a public user identifier with the corresponding Internet protocol multimedia subsystem network.

19. The system of claim 16, wherein the single data channel is established between a serving general packet radio services support node and a gateway general packet radio services support node in a mobile access network serving the single mobile endpoint device.

20. The system of claim 16, wherein the routing comprises:
  parsing a public user identifier embedded in each signaling message; and
  routing each signaling message to the corresponding internet protocol multimedia subsystem network using the public user identifier.

\* \* \* \* \*